United States Patent
Poon et al.

(10) Patent No.: US 9,784,985 B2
(45) Date of Patent: Oct. 10, 2017

(54) TITLED DICHROIC POLARIZING BEAMSPLITTER

(71) Applicant: 3M INNOVATIVE PROPERTIES COMPANY, St. Paul, MN (US)

(72) Inventors: Yarn Chee Poon, Singapore (SG); Andrew J. Ouderkirk, St. Paul, MN (US); Philip E. Watson, St. Paul, MN (US); Xiaohui Cheng, Singapore (SG); Kim Leong Tan, Singapore (SG); Stephen J. Willett, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/352,702

(22) PCT Filed: Oct. 23, 2012

(86) PCT No.: PCT/US2012/061414
§ 371 (c)(1),
(2) Date: Apr. 18, 2014

(87) PCT Pub. No.: WO2013/062932
PCT Pub. Date: May 2, 2013

(65) Prior Publication Data
US 2014/0253849 A1    Sep. 11, 2014

Related U.S. Application Data

(60) Provisional application No. 61/550,606, filed on Oct. 24, 2011.

(51) Int. Cl.
*G02F 1/1335*   (2006.01)
*G02B 27/28*    (2006.01)
(Continued)

(52) U.S. Cl.
CPC ......... *G02B 27/283* (2013.01); *G02B 27/102* (2013.01); *G02B 27/145* (2013.01);
(Continued)

(58) Field of Classification Search
CPC ............................................. G02F 2001/13355
See application file for complete search history.

(56) References Cited

U.S. PATENT DOCUMENTS 7,300,177 B2   11/2007   Conner
8,147,069 B2   4/2012    Seo et al.
(Continued)

FOREIGN PATENT DOCUMENTS

JP    2004-117676    4/2004
JP    2009-199046    9/2009
(Continued)

OTHER PUBLICATIONS

International Search Report for PCT International Application No. PCT/US2012/061414, mailed on Feb. 25, 2013, 3 pages.

*Primary Examiner* — Edmond Lau
(74) *Attorney, Agent, or Firm* — Robert S. Moshrefzadeh

(57) ABSTRACT

The disclosure generally relates to beamsplitters useful in color combiners, and in particular color combiners useful in small size format projectors such as pocket projectors. The disclosed beamsplitters and color combiners include a tilted dichroic reflective polarizer plate having at least two dichroic reflective polarizers tilted at different angles relative to incident light beams, with light collection optics to combine at least two colors of light.

20 Claims, 5 Drawing Sheets

(51) Int. Cl.
*G02B 27/10* (2006.01)
*G02B 27/14* (2006.01)
*G03B 21/20* (2006.01)
*G03B 33/06* (2006.01)
*H04N 9/31* (2006.01)

(52) U.S. Cl.
CPC ... *G02F 1/133533* (2013.01); *G03B 21/2033* (2013.01); *G03B 21/2073* (2013.01); *G03B 33/06* (2013.01); *H04N 9/3108* (2013.01); *H04N 9/3167* (2013.01); *G02F 2001/13355* (2013.01)

(56) References Cited

U.S. PATENT DOCUMENTS

| | | | |
|---|---|---|---|
| 8,654,444 B2 | 2/2014 | Ouderkirk et al. | |
| 2009/0251783 A1 | 10/2009 | Huibers et al. | |
| 2009/0310042 A1* | 12/2009 | Vidal et al. | G02B 27/283 349/8 |
| 2010/0245771 A1* | 9/2010 | Huang | G02B 27/283 353/20 |
| 2010/0245775 A1 | 9/2010 | Rubinshtein | |
| 2010/0290008 A1* | 11/2010 | Suga | G03B 21/28 353/20 |
| 2011/0222024 A1* | 9/2011 | Lu et al. | G02B 27/102 353/31 |
| 2011/0235175 A1* | 9/2011 | Poon et al. | G02B 27/102 359/487.04 |
| 2011/0242653 A1* | 10/2011 | Ouderkirk | G02B 27/102 359/487.04 |

FOREIGN PATENT DOCUMENTS

| | | |
|---|---|---|
| JP | 2010-256494 | 11/2010 |
| WO | WO 00/70376 | 11/2000 |
| WO | WO 2009/091610 | 7/2009 |
| WO | WO 2010-059681 | 5/2010 |
| WO | WO 2011-059879 | 5/2011 |
| WO | WO 2011/162321 | 12/2011 |
| WO | WO 2012-039895 | 3/2012 |
| WO | WO 2012-039993 | 3/2012 |
| WO | WO 2012-039995 | 3/2012 |
| WO | WO 2013-062930 | 5/2013 |

* cited by examiner

TITLED DICHROIC POLARIZING BEAMSPLITTER

CROSS REFERENCE TO RELATED APPLICATIONS

This application is a national stage filing under 35 U.S.C. 371 of PCT/US2012/061414, filed Oct. 23, 2012, which claims priority to US Provisional Application No. 61/550,606, filed Oct. 24, 2011, the disclosure of which is incorporated by reference in its/their entirety herein.

RELATED APPLICATIONS

This application is related to the following U.S. patent applications, which are incorporated by reference: U.S. Patent Application Ser. No. 61/385,237 entitled "Tilted Dichroic Color Combiner I" U.S. Patent Application Ser. No. 61/385,241 entitled "Tilted Dichroic Color Combiner II"; and U.S. Patent Application Ser. No. 61/385,248 entitled "Tilted Dichroic Color Combiner III"; all of which were filed on Sep. 22, 2010; and also to U.S. patent application entitled TILTED DICHROIC POLARIZED COLOR COMBINER U.S. Patent Application Ser. No. 61/550,611, filed on an even date herewith.

BACKGROUND

Projection systems used for projecting an image on a screen can use multiple color light sources, such as light emitting diodes (LEDs), with different colors to generate the illumination light. Several optical elements are disposed between the LEDs and the image display unit to combine and transfer the light from the LEDs to the image display unit. The image display unit can use various methods to impose an image on the light. For example, the image display unit may use polarization, as with transmissive or reflective liquid crystal displays.

Still other projection systems used for projecting an image on a screen can use white light configured to imagewise reflect from a digital micro-mirror (DMM) array, such as the array used in Texas Instruments' Digital Light Processor (DLP®) displays. In the DLP® display, individual mirrors within the digital micro-mirror array represent individual pixels of the projected image. A display pixel is illuminated when the corresponding mirror is tilted so that incident light is directed into the projected optical path. A rotating color wheel placed within the optical path is timed to the reflection of light from the digital micro-mirror array, so that the reflected white light is filtered to project the color corresponding to the pixel. The digital micro-mirror array is then switched to the next desired pixel color, and the process is continued at such a rapid rate that the entire projected display appears to be continuously illuminated. The digital micro-mirror projection system requires fewer pixelated array components, which can result in a smaller size projector.

Image brightness is an important parameter of a projection system. The brightness of color light sources and the efficiencies of collecting, combining, homogenizing and delivering the light to the image display unit all affect brightness. As the size of modern projector systems decreases, there is a need to maintain an adequate level of output brightness while at the same time keeping heat produced by the color light sources at a low level that can be dissipated in a small projector system. There is a need for a light combining system that combines multiple color lights with increased efficiency to provide a light output with an adequate level of brightness without excessive power consumption by light sources.

Such electronic projectors often include a device for optically homogenizing a beam of light in order to improve brightness and color uniformity for light projected on a screen. Two common devices are an integrating tunnel and a fly's eye array (FEA) homogenizer. Fly's eye homogenizers can be very compact, and for this reason is a commonly used device. Integrating tunnels can be more efficient at homogenization, but a hollow tunnel generally requires a length that is often 5 times the height or width, whichever is greater. Solid tunnels often are longer than hollow tunnels, due to the effects of refraction.

Pico and pocket projectors have limited available space for efficient color combiners, light integrators, and/or homogenizers. As a result, efficient and uniform light output from the optical devices used in these projectors (such as color combiners and polarization converters) can require compact and efficient optical designs.

SUMMARY

The disclosure generally relates to beamsplitters useful in color combiners, and in particular color combiners useful in small size format projectors such as pocket projectors. The disclosed beamsplitters and color combiners include a tilted dichroic reflective polarizer plate having at least two dichroic reflective polarizers tilted at different angles relative to incident light beams, with light collection optics to combine at least two colors of light. In one aspect, the present disclosure provides a color combiner that includes a light collection optic having a light input surface and an optical axis; and a first and a second light source disposed to inject a first and a second color light into the light input surface, at least one of the first and second light sources displaced from the optical axis. The color combiner further includes a dichroic reflective polarizer plate having a first dichroic reflective polarizer capable of reflecting the first polarization direction of the first color light toward a polarization rotating reflector, and transmitting other light; and a second dichroic reflective polarizer capable of reflecting the first polarization direction of the second color light toward the polarization rotating reflector, and transmitting other light. The first dichroic reflective polarizer and the second dichroic reflective polarizer are each tilted such that the first and the second color light reflect from the polarization rotating reflector to form a combined color polarized light beam having an orthogonal second polarization direction, the combined color polarized light beam propagating along a direction perpendicular to the polarization rotating reflector. In another aspect, the present disclosure provides an image projector including the color combiner and projection optics.

In another aspect, the present disclosure provides a color combiner that includes a light collection optic having a light input surface and an optical axis; a first and a second light source disposed to inject a first and a second color light into the light input surface, at least one of the first and second light sources displaced from the optical axis; and a dichroic reflective polarizer plate. The dichroic reflective polarizer plate includes a first dichroic reflective polarizer capable of reflecting a first polarization direction of the first color light toward a first polarization rotating reflector, and transmitting other light toward a second polarization rotating reflector; and a second dichroic reflective polarizer capable of reflecting the first polarization direction of the second color light toward the first polarization rotating reflector, and transmitting other light toward the second polarization rotating reflector. The first dichroic reflective polarizer and the second dichroic reflective polarizer are each tilted such that: the first and the second color light reflect from the first polarization rotating reflector forming a first combined color light beam having an orthogonal second polarization direction; and the first and the second color light reflect from the second polarization rotating reflector to form a second combined color light beam having the first polarization direction, and the first and second combined color light beams propagating along a direction perpendicular to the first polarization rotating reflector. In another aspect, the present disclosure provides an image projector including the color combiner and projection optics.

In yet another aspect, the present disclosure provides a color combiner that includes a light collection optic having a light input surface and an optical axis; a first, a second, and a third light source disposed to inject a first, a second, and a third color light into the light input surface, at least one of the first, the second, and the third light sources displaced from the optical axis; and a dichroic reflective polarizer plate. The dichroic reflective polarizer plate includes a first dichroic reflective polarizer capable of reflecting a first polarization direction of the first color light toward an output direction, and transmitting other light; a second dichroic reflective polarizer capable of reflecting the first polarization direction of the second color light toward the output direction, and transmitting other light; and a third dichroic reflective polarizer capable of reflecting the first polarization direction of the third color light toward the output direction, and transmitting other light. The color combiner further includes a half-wave retarder disposed to convert an orthogonal second polarization direction of the transmitted other light to the first polarization direction; and a dichroic reflector plate disposed to reflect the first polarization direction of the transmitted other light to the output direction. The dichroic reflector plate includes a first dichroic reflector capable of reflecting the first polarization direction of the first color light toward the output direction; a second dichroic reflector capable of reflecting the first polarization direction of the second color light toward the output direction; and a third dichroic reflector capable of reflecting the first polarization direction of the third color light toward the output direction. The first, the second, and the third dichroic reflective polarizers, and the first, the second, and the third dichroic reflectors are each tilted such that the first, the second, and the third color light form a combined color light beam having the first polarization direction. In another aspect, the present disclosure provides an image projector including the color combiner, a spatial light modulator, and projection optics.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
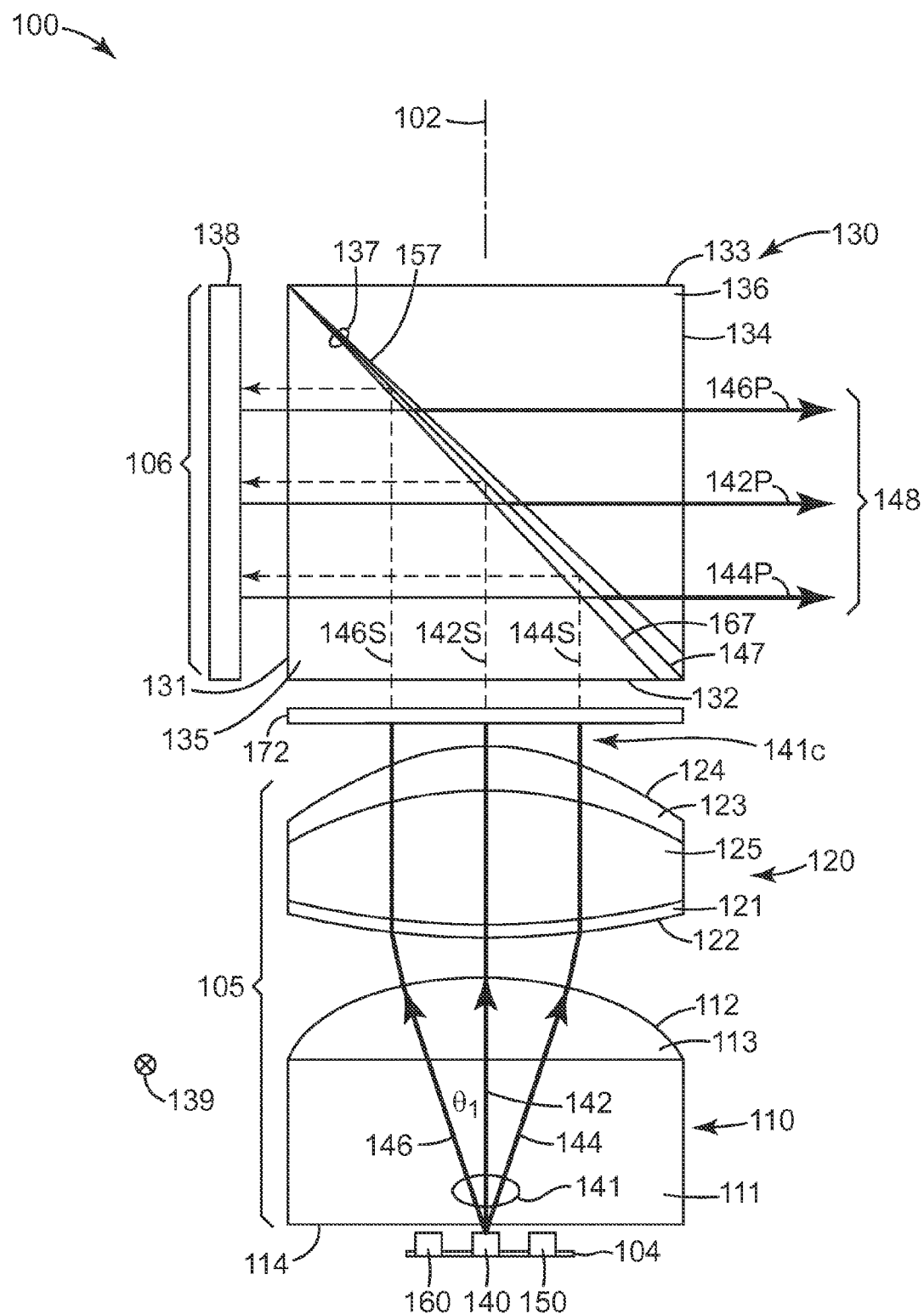
FIGS. 1A-1C show cross-section schematics of a tilted dichroic polarized color combiner.

This disclosure generally relates to image projectors, in particular image projectors having an improved uniformity of light by combining the light using a dichroic reflective polarizer plate. In one particular embodiment, the dichroic reflective polarizer plate includes a plurality of dichroic reflective polarizers laminated together, wherein each of the dichroic reflective polarizers can be tilted at an angle to a normal to the dichroic reflective polarizer plate, and the combined light is a polarized light.

The optical elements described herein can be configured as color combiners that receive different wavelength spectrum lights and produce a combined light output that includes the different wavelength spectrum lights. In one aspect, the received light inputs are unpolarized, and the combined light output is polarized. In some embodiments, the combined light has the same etendue as each of the received lights. The combined light can be a polychromatic combined light that comprises more than one wavelength spectrum of light. The combined light can be a time sequenced output of each of the received lights. In one aspect, each of the different wavelength spectra of light corresponds to a different color light (for example red, green and blue), and the combined light output is white light, or a time sequenced red, green and blue light. For purposes of the description provided herein, "color light" and "wavelength spectrum light" are both intended to mean light having a wavelength spectrum range which may be correlated to a specific color if visible to the human eye. The more general term "wavelength spectrum light" refers to both visible and other wavelength spectrums of light including, for example, infrared light.

Also for the purposes of the description provided herein, the term "aligned to a desired polarization state" is intended to associate the alignment of the pass axis of an optical element to a desired polarization state of light that passes through the optical element, that is, a desired polarization state such as s-polarization, p-polarization, right-circular polarization, left-circular polarization, or the like. In one embodiment described herein with reference to the Figures, an optical element such as a polarizer aligned to the first polarization state means the orientation of the polarizer that passes the p-polarization state of light, and reflects or absorbs the second polarization state (in this case the s-polarization state) of light. It is to be understood that the polarizer can instead be aligned to pass the s-polarization state of light, and reflect or absorb the p-polarization state of light, if desired.

Also for the purposes of the description provided herein, the term "facing" refers to one element disposed so that a perpendicular line from the surface of the element follows an optical path that is also perpendicular to the other element. One element facing another element can include the elements disposed adjacent each other. One element facing another element further includes the elements separated by optics so that a light ray perpendicular to one element is also perpendicular to the other element.

In one particular embodiment, a color combiner is described that includes at least two light emitting diodes (LEDs), each with a different color. The light emitted from the two LEDs is collimated into beams that substantially overlap, and the light from the two LEDs is combined and converted to a single polarization state. The combined single polarization state light has a lower etendue and higher brightness than the light emitted by the two LEDs.

The LEDs may be used to illuminate projectors. Since LEDs emit light over an area with a near Lambertian angular distribution, the brightness of a projector is limited by the etendue of the source and the projection system. One method for reducing the etendue of the LED light source is to use dichroic reflectors to make two or more colors of LEDs spatially overlap, such that they appear to be emitting from the same region. In one particular embodiment, the present disclosure describes an article that combines different color LEDs using dichroic reflective polarizers that reflect one polarization direction of one wavelength spectrum of light, and transmit the other polarization direction and also transmit both polarization directions of other wavelength spectrums of light.

In one aspect, the disclosure provides a compact method of efficiently combining the output from different color light sources. This can be particularly useful for producing illuminators for compact projection systems that are etendue limited. For example, a linear array of red, green, and blue LEDs, where the output of each LED is partially collimated by a set of primary optics, is incident on a polarization converter that includes a dichroic reflective polarizer plate assembly. The dichroic reflective polarizer plate assembly contains tilted dichroic reflective polarizers that reflect the red, green, and blue light at different angles. The reflected light is then output as a polarized collimated combined color light beam.

The configuration of the 3 LEDs can be expanded to other colors, including yellow and infrared light, as understood by one of skill in the art. The LEDs can be arranged in various patterns, including linear arrays and triangular arrays. The light sources may include lasers combined with LEDs, and may be also be based on an all laser system. The LEDs may consist of a set emitting at least primary colors on short wavelength range of red, green, and blue, and a second set emitting the primary colors on the long wavelength range of red, green, and blue.

LCoS-based portable projection systems are becoming common due to the availability of low cost and high resolution LCoS panels. A list of elements in an LED-illuminated LCoS projector may include LED light source or sources, optional color combiner, optional pre-polarizing system, relay optics, PBS, LCoS panel, and projection lens unit. For LCoS-based projection systems, the efficiency and contrast of the projector is directly linked to the degree of polarization of light entering the PBS. For at least this reason, a pre-polarizing system that either utilizes a reflection/recycling optic or a polarization-conversion optical element, is often required.

Polarization conversion schemes utilizing polarizing beam splitters and half-wave retarders are one of the most efficient ways to provide polarized light into the PBS. One challenge with polarization-converted light is that it may suffer from spatial nonuniformity, leading to artifacts in the displayed image. Therefore, in systems with polarization converters, a homogenization system can be desirable, as described elsewhere.

In some cases, optical projectors use a non-polarized light source, such as a light emitting diode (LED) or a discharge light, a polarization selecting element, a first polarization spatial modulator, and a second polarization selecting element. Since the first polarization selecting element rejects 50% of the light emitted from the non-polarized light source, polarization-selective projectors can often have a lower efficiency than non-polarized devices. In some cases, the efficiency can be improved in such devices by recycling the rejected polarization direction, such as by using a reflective polarizer and a quarter-wave plate, or by conversion of the rejected polarization direction to the desired polarization direction, as described elsewhere.

One technique of increasing the efficiency of polarization-selective projectors is to add a polarization converter between the light source and the first polarization selecting element. Generally, there are two ways of designing a polarization converter used in the art. The first is to partially collimate the light emitting from the light source, pass the partially collimated beam of light through an array of lenses, and position an array of polarization converters at each focal point. The polarization converter typically has a polarizing beam splitter having polarization selective tilted film (for example MacNeille polarizer, a wire grid polarizer, or birefringent optical film polarizer), where the reflected polarization is reflected by a tilted reflector such that the reflected beam propagates parallel to the beam that is transmitted by the tilted polarization selective film. Either one or the other beams of polarized light is passed through half-wave retarders, such that both beams have the same polarization state.

Another technique of converting the unpolarized light beam to a light beam having a single polarization state is to pass the entire beam of light through a tilted polarization selector, and the split beams are conditioned by reflectors and half-wave retarders such that a single polarization state is emitted. Illuminating a polarization selective spatial light modulator directly with a polarization converter can result in illuminance and color non-uniformity.

Figure 1B:
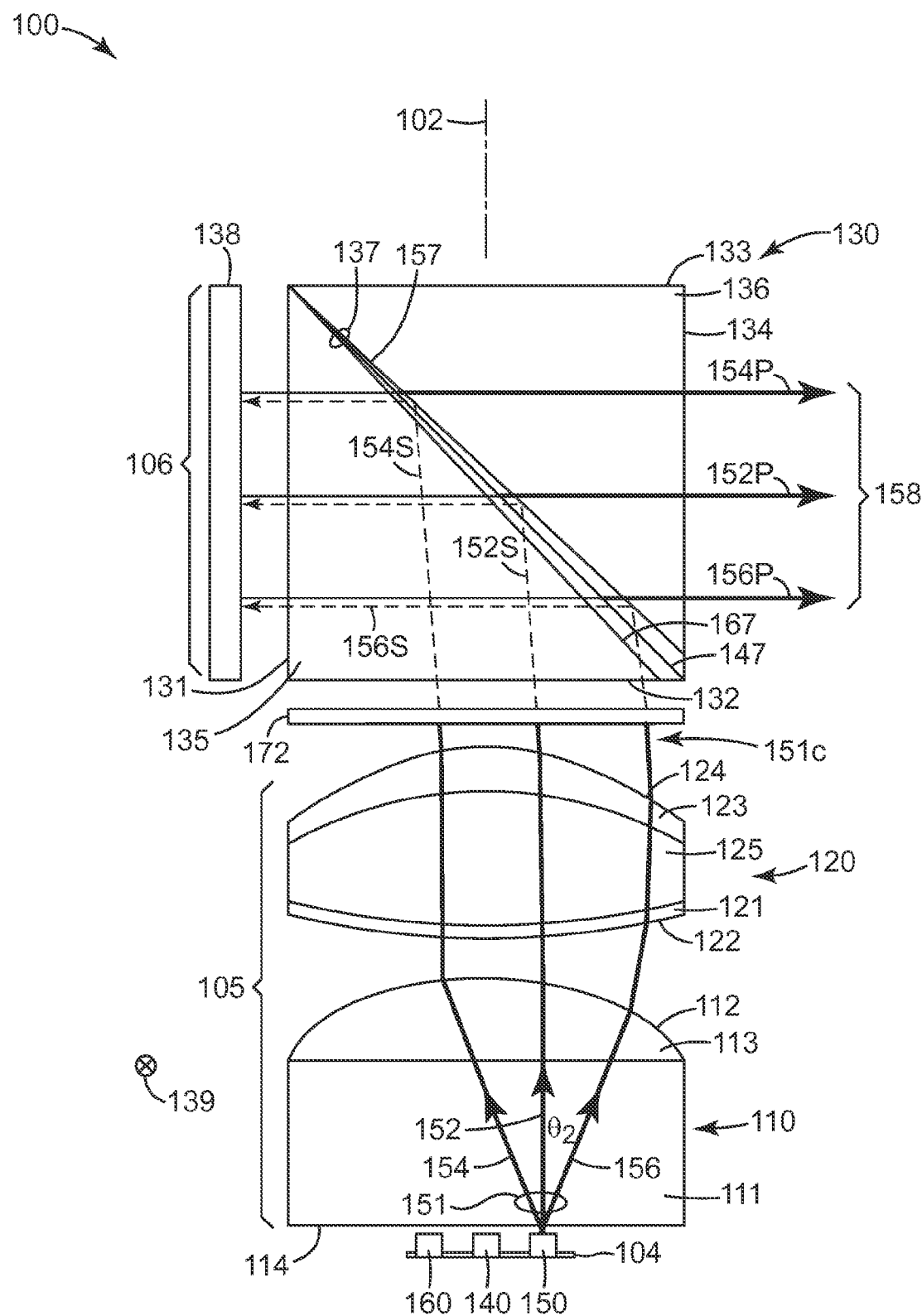
Figure 1C:
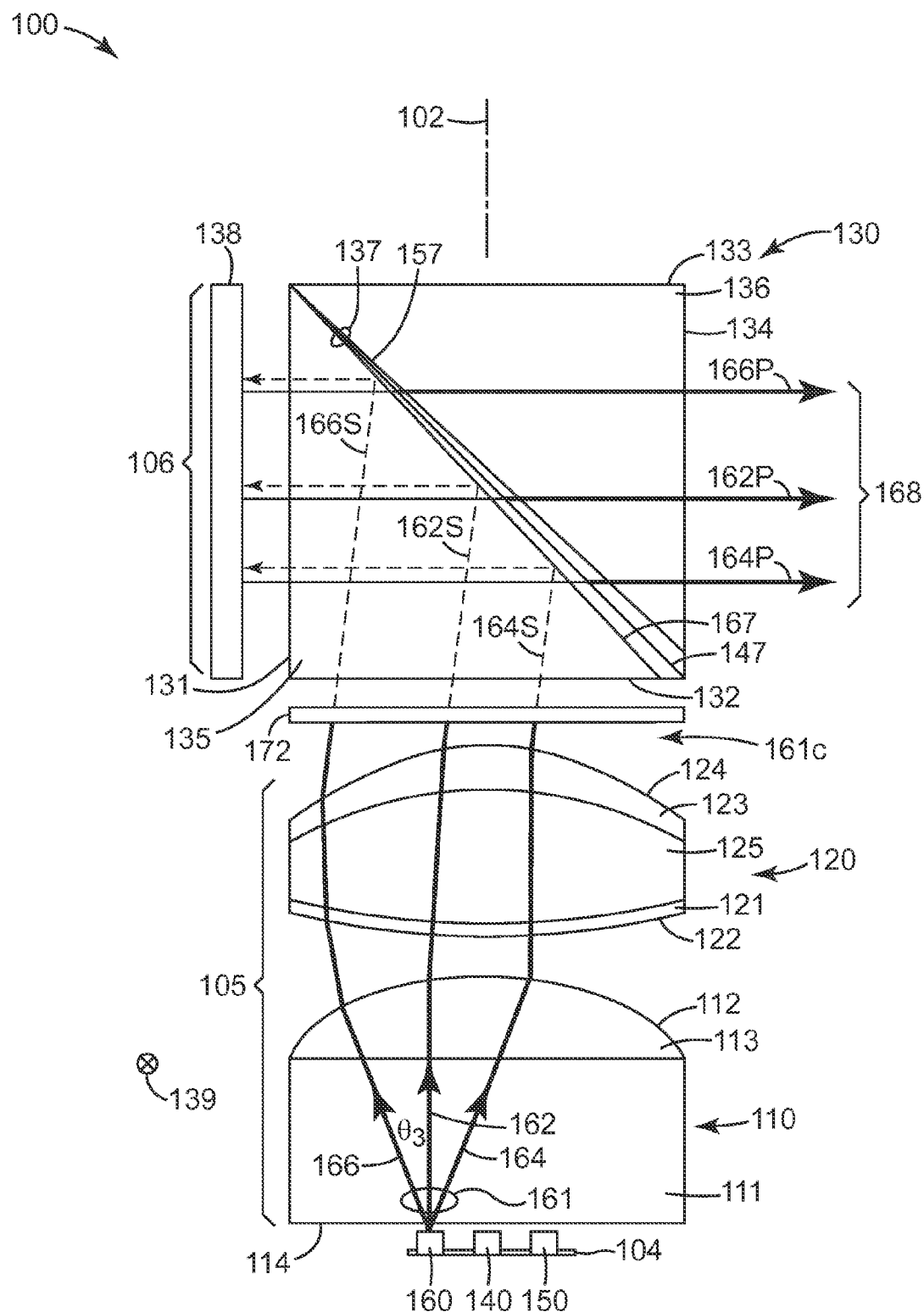

FIGS. 1A-1C shows a cross-section schematic of a tilted dichroic polarized color combiner 100 according to one aspect of the disclosure. In FIGS. 1A-1C, the tilted dichroic polarized color combiner 100 includes a light collection optics 105 and a tilted dichroic polarizing beamsplitter assembly 106. Light collection optics 105 includes a first lens element 110 and a second lens element 120, a light input surface 114, and an optical axis 102 perpendicular to the light input surface 114. A first light source 140, a second light source 150, and an optional third light source 160 are each disposed on a light injection surface 104 that faces the light input surface 114. At least two of the first, the second, and the optional third light sources 140, 150, 160, are displaced from the optical axis 102, and one of the first, the second, and the optional third light sources 140, 150, 160 can be positioned on the optical axis. Each of the first, the second, and the optional third light sources 140, 150, 160, are disposed to inject a first color light 141, a second color light 151, and an optional third color light 161, respectively, into the light input surface 114, as described elsewhere.

In one particular embodiment, light collection optics 105 can be a light collimator that serves to collimate the light emitted from the first, second, and optional third light sources 140, 150, 160. Light collection optics 105 can include a one lens light collimator (not shown), a two lens light collimator (shown), a diffractive optical element (not shown), or a combination thereof. The two lens light collimator has first lens element 110 that includes a first convex surface 112 disposed opposite the light input surface 114. Second lens element 120 includes a second surface 122 facing the first convex surface 112, and a third convex surface 124 opposite the second surface 122. Second surface 122 can be selected from a convex surface, a planar surface, and a concave surface.

Each of the first color light 141, second color light 151, and optional third color light 161 become a collimated first color light 141c, a collimated second color light 151c, and a collimated optional third color light 161c upon exiting the light collection optics 105. Since each of the first light source 140, second light source 150, and optional third light source 160 are disposed on light injection surface 104 at differing separations from the optical axis 102 of light collection optics 105, each of the collimated first, second, and optional third color light 141c, 151c, 161c are collimated at slightly different angles relative to the optical axis, as they enter the tilted dichroic polarizing beamsplitter assembly 106.

In one particular embodiment, tilted dichroic polarized color combiner 100 further includes an optional polarizer 172 aligned to a first polarization direction 139 and disposed between the tilted dichroic polarizing beamsplitter assembly 106 and the light injection surface 104. The optional polarizer 172 can be used to inject only one polarization direction into tilted dichroic polarized color combiner 100 if desired, and in the embodiments described herein the optional polarizer 172 is included. It is to be understood that in some cases, the optional polarizer 172 is omitted, and both polarization states can be injected.

The optional polarizer 172 can be disposed at any desired location between the tilted dichroic polarizing beamsplitter assembly 106 and the light injection surface 104; however, in some cases, disposing the optional polarizer 172 in the region of the collimated first, second, and optional third color light 141c, 151c, 161c can be preferred. The optional polarizer 172 can be any of the reflective polarizers described herein, or it can be an absorbing polarizer. The optional polarizer 172 can further include an associated quarter-wave retarder (not shown) disposed between the polarizer and the light source for light recycling, as known to one of skill in the art. Optional polarizer 172 is capable of transmitting a first polarization direction of each of the first, second, and optional third color lights 141, 151, 161, and either reflecting or absorbing a second polarization direction of each of the first, second, and optional third color lights 141, 151, 161.

In one particular embodiment, tilted dichroic polarizing beamsplitter assembly 106 includes a tilted dichroic polarizing beamsplitter 130 and a polarization rotating reflector 138. In some cases, a prismatic polarizing beam splitter (as shown in the Figures) can be used; however, alternatively, components can be retained as pellicles (not shown) in the optical path. The tilted dichroic polarizing beamsplitter 130 includes a first prism 135 having a first face 131, and an input face 132, and a second prism 136 having a third face 133 and an output face 134. The tilted dichroic polarizing beamsplitter 130 further includes a dichroic reflective polarizer plate 137 that includes a first dichroic reflective polarizer 147, a second dichroic reflective polarizer 157, and an optional third dichroic reflective polarizer 167 disposed on a diagonal of tilted dichroic polarizing beamsplitter 130, between the first and second prisms 135, 136.

The polarization rotating reflector 138 can reverse the propagation direction of the light and alter the magnitude of the polarization components, depending of the type and orientation of a retarder disposed in the polarization rotating reflector. The polarization rotating reflector can include a broadband mirror or a wavelength-selective mirror, such as a color-selective dichroic filter, and a retarder. The retarder can provide any desired retardation, such as an eighth-wave retarder, a quarter-wave retarder, and the like. In embodiments described herein, there is an advantage to rotating the polarization direction to the orthogonal direction such that light can be transmitted through the dichroic reflective polarizer plate 137, such as by using a quarter-wave retarder and an associated dichroic reflector. For example, s-polarized light is changed to circularly polarized light as it passes through a quarter-wave retarder aligned at an angle of 45° to the axis of light polarization, changes direction of circular polarization upon reflection, and becomes p-polarized light as it passes through the quarter-wave retarder again.

In one particular embodiment, the polarization rotating reflector 138 can include a spatial light modulator, such as a liquid crystal on silicon (LCoS) imager that can impart an image to incident polarized light beams of each color, and reflect the image-containing light beams having the orthogonal polarization state. In some cases, the spatial light modulator can be time-sequenced to each of the colors of light to produce a collimated combined color image that can be enlarged through projection optics onto a projection screen.

In one particular embodiment, each of the first dichroic reflective polarizer 147, second dichroic reflective polarizer 157, and optional third dichroic reflective polarizer 167 that are combined to form dichroic reflective polarizer plate 137, can be fabricated using thin-film inorganic deposition techniques such as used to fabricate MacNeille polarizers, as known to one of skill in the art. In some cases, each of the dichroic reflective polarizers can be fabricated on separate glass substrates that can be ground and polished to the desired angle, and bonded together using optical adhesives.

In one particular embodiment, different polymeric multilayer optical films can be used for each of the dichroic reflective polarizers. Multilayer optical film polarizers can include different "packets" of layers that serve to interact with different wavelength ranges of light. For example, a unitary multilayer optical film polarizer can include several packets of layers through the film thickness, each packet interacting with a different wavelength range (for example color) of light to reflect one polarization state and transmit the other polarization state. In one aspect, a multilayer optical film can have a first packet of layers adjacent a first surface of the film that interacts with, for example, blue colored light (that is, a "blue layers"), a second packet of layers that interacts with, for example, green colored light (that is, a "green layers"), and a third packet of layers adjacent a second surface of the film that interacts with, for example, red colored light (that is a "red layers"). Typically, the separation between layers in the "blue layers" is much smaller than the separation between layers in the "red layers", in order to interact with the shorter (and higher energy) blue wavelengths of light.

In some cases, polymeric multilayer optical film polarizers can be particularly preferred reflective polarizers that can include packets of film layers as described above. Separate polymeric multilayer optical film polarizers can be fabricated in correspondence with the first, second, and optional third dichroic reflective polarizers 147, 157, 167, and assembled using glass substrates and optical adhesives to form the dichroic reflective polarizer plate 137. In some cases, one or more polymeric multilayer optical film polarizer packets can be used with one or more thin-film inorganically deposited thin films to result in the dichroic reflective polarizer plate.

The described components of the tilted dichroic polarizing beamsplitter 106 collectively convert each of the collimated (and unpolarized) first, second, and optional third color light 141c, 151c, 161c into a collimated combined polarized light, where each of the different collimated light colors are collimated in the same direction, as described with reference to the Figures.

Turning to FIG. 1A, the path of the first color light 141 from first light source 140 can be traced through tilted dichroic polarized color combiner 100. First color light 141 includes a first central light ray 142 travelling in the first light propagation direction, and a cone of rays within first input light collimation angle θ1, the boundaries of which are represented by first boundary light rays 144, 146. The first central light ray 142 is injected from first light source 140 into light input surface 114 in a direction generally parallel to the optical axis 102, passes through first lens element 110, second lens element 120, and emerges from light collection optics 105 as first central light ray 142 that is central to first collimated color light 141c. Each of the first boundary light rays 144, 146 are injected into the light input surface 114 in a direction generally at the first input light collimation angle θ1 to the optical axis 102, passes through first lens element 110, second lens element 120, and emerges from light collection optics 105 as first boundary light rays 144, 146 that form boundaries to first collimated color light 141c. As can be seen from FIG. 1A, the light collection optics 105 serve to collimate the first color light 141 passing from the first light source 140 to emerge as first collimated color light 141c.

Each of the first central light ray 142 and the first boundary light rays 144, 146, intercept optional polarizer 172 and are each split into transmitted s-polarized component and a reflected or absorbed p-polarized component. In some cases, optional polarizer 172 can be a reflective polarizer and p-polarized light rays can be reflected and recycled using a quarter-wave retarder as described elsewhere; in some cases, optional polarizer 172 can instead be an absorbing polarizer, and the p-polarized light rays can be absorbed. First central light ray 142 is split into a first s-polarized central light ray 142s and a first p-polarized central light ray (not shown). Transmitted first s-polarized central light ray 142s enters input face 132 of first prism 135, passes through third dichroic reflective polarizer 167, reflects from first dichroic reflective polarizer 147, passes again through third dichroic reflective polarizer 167, and leaves first prism 135 through first face 131. Transmitted first s-polarized central light ray 142s intercepts polarization rotating reflector 138 in a perpendicular direction, reflects as p-polarized central light ray 142p perpendicular to polarization rotating reflector 138, enters tilted dichroic polarizing beamsplitter 130 through first face 131, passes unchanged through first, second, and third dichroic reflective polarizers 147, 157, 167, and exits tilted dichroic polarizing beamsplitter 130 through output face 134 as a portion of first p-polarized collimated light 148.

First boundary light rays 144, 146, are split into a first s-polarized boundary light rays 144s, 146s, and first p-polarized boundary light rays (not shown). Transmitted first s-polarized boundary light rays 144s, 146s, enter input face 132 of first prism 135, pass through third dichroic reflective polarizer 167, reflect from first dichroic reflective polarizer 147, pass again through third dichroic reflective polarizer 167, and leave first prism 135 through first face 131. Transmitted first s-polarized boundary light rays 144s, 146s, intercept polarization rotating reflector 138 in a perpendicular direction, reflect as p-polarized boundary light rays 144p, 146p, perpendicular to polarization rotating reflector 138, enter tilted dichroic polarizing beamsplitter 130 through first face 131, pass unchanged through first, second, and third dichroic reflective polarizers 147, 157, 167, and exit tilted dichroic polarizing beamsplitter 130 through output face 134 as a portion of first p-polarized collimated light 148.

Turning to FIG. 1B, the path of the second color light 151 from second light source 150 can be traced through tilted dichroic polarized color combiner 100. Second color light 151 includes a second central light ray 152 travelling in the second light propagation direction, and a cone of rays within second input light collimation angle θ2, the boundaries of which are represented by second boundary light rays 154, 156. The second central light ray 152 is injected from second light source 150 into light input surface 114 in a direction generally parallel to the optical axis 102, passes through first lens element 110, second lens element 120, and emerges from light collection optics 105 as second central light ray 152 that is central to second collimated color light 151c. Each of the second boundary light rays 154, 156 are injected into the light input surface 114 in a direction generally at the second input light collimation angle θ2 to the optical axis 102, passes through first lens element 110, second lens element 120, and emerges from light collection optics 105 as second boundary light rays 154, 156 that form boundaries to second collimated color light 151c. As can be seen from FIG. 1B, the light collection optics 105 serve to collimate the second color light 151 passing from the second light source 150 to emerge as second collimated color light 151c.

Each of the second central light ray 152 and the second boundary light rays 154, 156, intercept optional polarizer 172 and are each split into transmitted s-polarized component and a reflected or absorbed p-polarized component. In some cases, optional polarizer 172 can be a reflective polarizer and p-polarized light rays can be reflected and recycled using a quarter-wave retarder as described elsewhere; in some cases, optional polarizer 172 can instead be an absorbing polarizer, and the p-polarized light rays can be absorbed. Second central light ray 152 is split into a second s-polarized central light ray 152s and a second p-polarized central light ray (not shown). Transmitted second s-polarized central light ray 152s enters input face 132 of first prism 135, passes through third and first dichroic reflective polarizers 167, 147, reflects from second dichroic reflective polarizer 157, passes again through third and first dichroic reflective polarizers 167, 147, and leaves first prism 135 through first face 131. Transmitted second s-polarized central light ray 152s intercepts polarization rotating reflector 138 in a perpendicular direction, reflects as p-polarized central light ray 152p perpendicular to polarization rotating reflector 138, enters tilted dichroic polarizing beamsplitter 130 through first face 131, passes unchanged through first, second, and third dichroic reflective polarizers 147, 157, 167, and exits tilted dichroic polarizing beamsplitter 130 through output face 134 as a portion of second p-polarized collimated light 158.

Second boundary light rays 154, 156, are split into a second s-polarized boundary light rays 154s, 156s, and second p-polarized boundary light rays (not shown). Transmitted second s-polarized boundary light rays 154s, 156s, enter input face 132 of first prism 135, pass through third and first dichroic reflective polarizers 167, 147, reflect from second dichroic reflective polarizer 157, pass again through third and first dichroic reflective polarizers 167, 147, and leave first prism 135 through first face 131. Transmitted second s-polarized boundary light rays 154s, 156s, intercept polarization rotating reflector 138 in a perpendicular direction, reflect as p-polarized boundary light rays 154p, 156p, perpendicular to polarization rotating reflector 138, enter tilted dichroic polarizing beamsplitter 130 through first face 131, pass unchanged through first, second, and third dichroic reflective polarizers 147, 157, 167, and exit tilted dichroic polarizing beamsplitter 130 through output face 134 as a portion of second p-polarized collimated light 158.

Turning to FIG. 1C, the path of the third color light 161 from third light source 160 can be traced through tilted dichroic polarized color combiner 100. Third color light 161 includes a third central light ray 162 travelling in the third light propagation direction, and a cone of rays within third input light collimation angle θ3, the boundaries of which are represented by third boundary light rays 164, 166. The third central light ray 162 is injected from third light source 160 into light input surface 114 in a direction generally parallel to the optical axis 102, passes through first lens element 110, second lens element 120, and emerges from light collection optics 105 as third central light ray 162 that is central to third collimated color light 161c. Each of the third boundary light rays 164, 166 are injected into the light input surface 114 in a direction generally at the third input light collimation angle θ3 to the optical axis 102, passes through first lens element 110, second lens element 120, and emerges from light collection optics 105 as third boundary light rays 164, 166 that form boundaries to third collimated color light 161c. As can be seen from FIG. 1C, the light collection optics 105 serve to collimate the third color light 161 passing from the third light source 160 to emerge as third collimated color light 161c.

Each of the third central light ray 162 and the third boundary light rays 164, 166, intercept optional polarizer 172 and are each split into transmitted s-polarized component and a reflected or absorbed p-polarized component. In some cases, optional polarizer 172 can be a reflective polarizer and p-polarized light rays can be reflected and recycled using a quarter-wave retarder as described elsewhere; in some cases, optional polarizer 172 can instead be an absorbing polarizer, and the p-polarized light rays can be absorbed. Third central light ray 162 is split into a third s-polarized central light ray 162s and a third p-polarized central light ray (not shown). Transmitted third s-polarized central light ray 162s enters input face 132 of first prism 135, reflects from third dichroic reflective polarizer 167, and leaves first prism 135 through first face 131. Transmitted third s-polarized central light ray 162s intercepts polarization rotating reflector 138 in a perpendicular direction, reflects as p-polarized central light ray 162p perpendicular to polarization rotating reflector 138, enters tilted dichroic polarizing beamsplitter 130 through first face 131, passes unchanged through first, second, and third dichroic reflective polarizers 147, 157, 167, and exits tilted dichroic polarizing beamsplitter 130 through output face 134 as a portion of third p-polarized collimated light 168.

Third boundary light rays 164, 166, are split into a third s-polarized boundary light rays 164s, 166s, and third p-polarized boundary light rays (not shown). Transmitted third s-polarized boundary light rays 164s, 166s, enter input face 132 of first prism 135, reflect from third dichroic reflective polarizer 167, and leave first prism 135 through first face 131. Transmitted third s-polarized boundary light rays 164s, 166s, intercept polarization rotating reflector 138 in a perpendicular direction, reflect as p-polarized boundary light rays 164p, 166p, perpendicular to polarization rotating reflector 138, enter tilted dichroic polarizing beamsplitter 130 through first face 131, pass unchanged through first, second, and third dichroic reflective polarizers 147, 157, 167, and exit tilted dichroic polarizing beamsplitter 130 through output face 134 as a portion of third p-polarized collimated light 168. In one particular embodiment, the first, second, and third p-polarized collimated light 148, 158, 168 can be a green, a red, and a blue colored light that form a combined color p-polarized collimated light. The combined color p-polarized collimated light can be expanded through projection optics in an image projector to result in an enlarged image projected onto a screen.

In one particular embodiment, each of the first, the second, and the third input collimation angles θ1, θ2, θ3 can be the same, and injection optics (not shown) associated with each of the first, the second, and the optional third input light sources 140, 150, 160, can restrict these input collimation angles to angles between about 10 degrees and about 80 degrees, or between about 10 degrees to about 70 degrees, or between about 10 degrees to about 60 degrees, or between about 10 degrees to about 50 degrees, or between about 10 degrees to about 40 degrees, or between about 10 degrees to about 30 degrees or less. In one particular embodiment, each of the input collimation angles ranges from about 60 to about 70 degrees.

Figure 2:
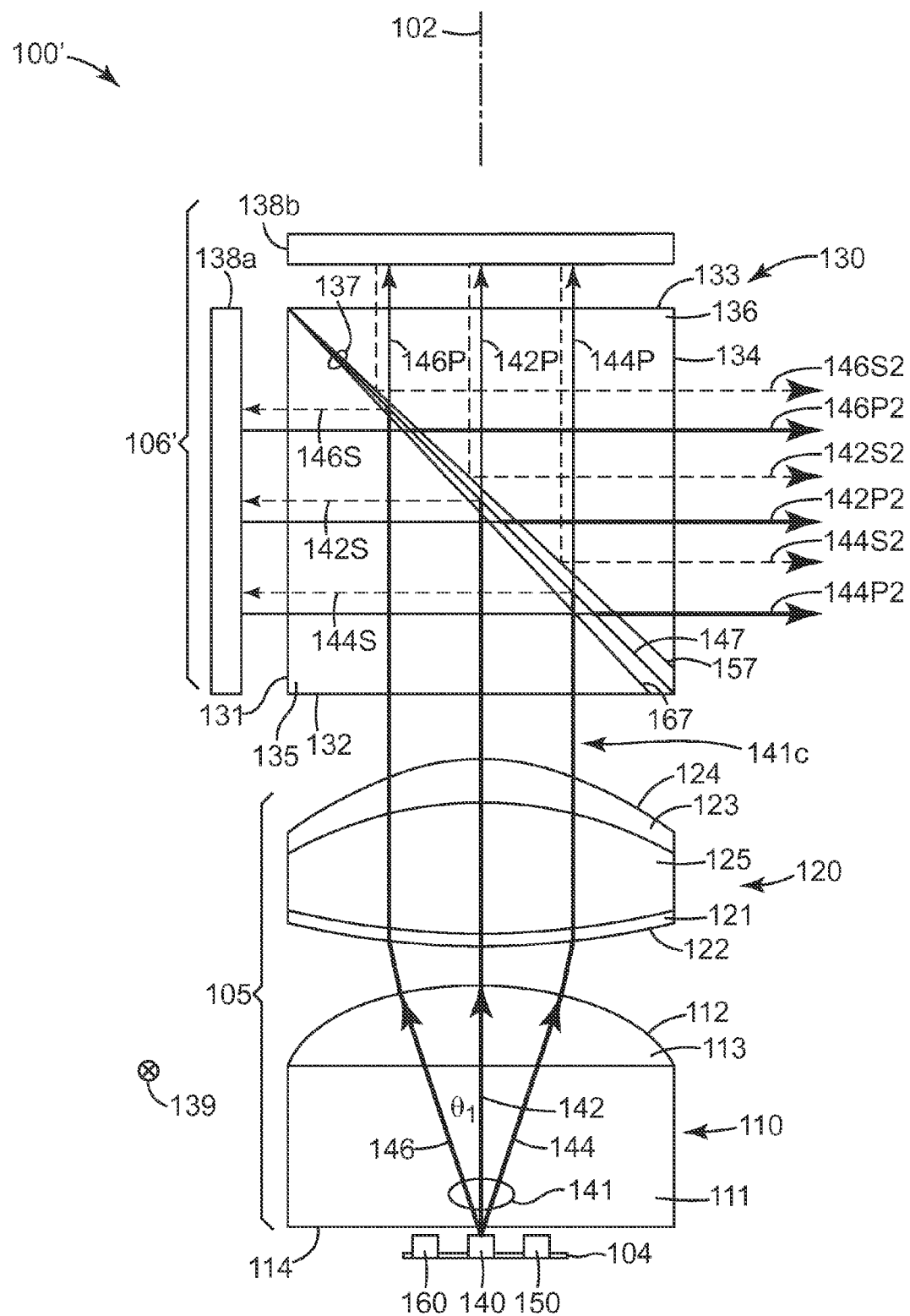
FIG. 2 shows a cross-section schematic of a tilted dichroic polarized color combiner.

FIG. 2 shows a cross-section schematic of a tilted dichroic polarized color combiner 100' according to one aspect of the disclosure. In FIG. 2, the tilted dichroic polarized color combiner 100' includes a light collection optics 105 and a tilted dichroic polarizing beamsplitter assembly 106'. Light collection optics 105 includes a first lens element 110 and a second lens element 120, a light input surface 114, and an optical axis 102 perpendicular to the light input surface 114. A first light source 140, a second light source 150, and an optional third light source 160 are each disposed on a light injection surface 104 that faces the light input surface 114. At least two of the first, the second, and the optional third light sources 140, 150, 160, are displaced from the optical axis 102, and one of the first, the second, and the optional third light sources 140, 150, 160 can be positioned on the optical axis. Each of the first, the second, and the optional third light sources 140, 150, 160, are disposed to inject light into the light input surface 114 in a manner similar to that described with reference to FIGS. 1A-1C. For brevity, only the path of a first color light 141 will be described with reference to FIG. 2; however, it is to be understood that a second color light 151, and an optional third color light 161 will follow similar paths through tilted dichroic polarized color combiner 100', as described elsewhere.

In one particular embodiment, light collection optics 105 can be a light collimator that serves to collimate the light emitted from the first, second, and optional third light sources 140, 150, 160. Light collection optics 105 can include a one lens light collimator (not shown), a two lens light collimator (shown), a diffractive optical element (not shown), or a combination thereof. The two lens light collimator has first lens element 110 that includes a first convex surface 112 disposed opposite the light input surface 114. Second lens element 120 includes a second surface 122 facing the first convex surface 112, and a third convex surface 124 opposite the second surface 122. Second surface 122 can be selected from a convex surface, a planar surface, and a concave surface. The first color light 141 becomes a collimated first color light 141c upon exiting the light collection optics 105.

In one particular embodiment, tilted dichroic polarizing beamsplitter assembly 106' includes a tilted dichroic polarizing beamsplitter 130, a first polarization rotating reflector 138a, and a second polarization rotating reflector 138b. In some cases, a prismatic polarizing beam splitter (as shown in the Figures) can be used; however, alternatively, components can be retained as pellicles (not shown) in the optical path. The tilted dichroic polarizing beamsplitter 130 includes a first prism 135 having a first face 131, and an input face 132, and a second prism 136 having a third face 133 and an output face 134. The tilted dichroic polarizing beamsplitter 130 further includes a dichroic reflective polarizer plate 137 that includes a first dichroic reflective polarizer 147, a second dichroic reflective polarizer 157, and an optional third dichroic reflective polarizer 167 disposed on a diagonal of tilted dichroic polarizing beamsplitter 130, between the first and second prisms 135, 136.

The first and second polarization rotating reflectors 138*a*, 138*b* can each reverse the propagation direction of the light and alter the magnitude of the polarization components, depending of the type and orientation of a retarder disposed in the polarization rotating reflector. The polarization rotating reflector can include a broadband mirror or a wavelength-selective mirror, such as a color-selective dichroic filter, and a retarder. The retarder can provide any desired retardation, such as an eighth-wave retarder, a quarter-wave retarder, and the like. In embodiments described herein, there is an advantage to rotating the polarization direction to the orthogonal direction such that light can be transmitted through the dichroic reflective polarizer plate 137, such as by using a quarter-wave retarder and an associated dichroic reflector. For example, s-polarized light is changed to circularly polarized light as it passes through a quarter-wave retarder aligned at an angle of 45° to the axis of light polarization, changes direction of circular polarization upon reflection, and becomes p-polarized light as it passes through the quarter-wave retarder again. In some cases, such a combination of polarization rotating reflectors can be used to provide a collimated unpolarized combined color light from the tilted dichroic polarizing beamsplitter assembly 106'.

In one particular embodiment, at least one of the first and second polarization rotating reflectors 138*a*, 138*b* can include a spatial light modulator, such as a liquid crystal on silicon (LCoS) imager that can impart an image to incident polarized light beams, and reflect the image-containing light beams having the orthogonal polarization state. In some cases, different images can be imparted separately to each of the orthogonal polarization directions interacting with spatial light modulators, as described elsewhere. In this case, the resulting collimated combined color light can be used, for example, as a portion of a stereoscopic display where s-polarized light corresponds to an image viewed by one eye, and p-polarized light corresponds to a second image viewed by the other eye, resulting in a 3-dimensional stereoscopic image. In some cases, identical images in registration can instead be imparted to each of the orthogonal polarization directions, and the resulting collimated combined color light can have an improved brightness that can be as high as double the brightness of a single polarization state, as known to one of skill in the art.

In one particular embodiment, each of the first dichroic reflective polarizer 147, second dichroic reflective polarizer 157, and optional third dichroic reflective polarizer 167 that are combined to form dichroic reflective polarizer plate 137, can be fabricated using thin-film inorganic deposition techniques as known to one of skill in the art. In some cases, each of the dichroic reflective polarizers can be fabricated on separate glass substrates that can be ground and polished to the desired angle, and bonded together using optical adhesives.

In one particular embodiment, different polymeric multilayer optical films can be used for each of the dichroic reflective polarizers. Multilayer optical film polarizers can include different "packets" of layers that serve to interact with different wavelength ranges of light. For example, a unitary multilayer optical film polarizer can include several packets of layers through the film thickness, each packet interacting with a different wavelength range (e.g. color) of light to reflect one polarization state and transmit the other polarization state. In one aspect, a multilayer optical film can have a first packet of layers adjacent a first surface of the film that interacts with, for example, blue colored light (that is, a "blue layers"), a second packet of layers that interacts with, for example, green colored light (that is, a "green layers"), and a third packet of layers adjacent a second surface of the film that interacts with, for example, red colored light (that is a "red layers"). Typically, the separation between layers in the "blue layers" is much smaller than the separation between layers in the "red layers", in order to interact with the shorter (and higher energy) blue wavelengths of light. In some cases, polymeric multilayer optical film polarizers can be particularly preferred reflective polarizers that can include packets of film layers as described above. Separate polymeric multilayer optical film polarizers can be fabricated in correspondence with the first, second, and optional third dichroic reflective polarizers 147, 157, 167, and assembled using glass substrates and optical adhesives to form the dichroic reflective polarizer plate 137.

The described components of the tilted dichroic polarizing beamsplitter 106' collectively convert each of the collimated (and unpolarized) first, second, and optional third color light 141*c*, 151*c*, 161*c* into a first collimated combined p-polarized light and a second collimated combined s-polarized light, where each of the different collimated light colors are collimated in the same direction, as described with reference to the Figures.

Turning to FIG. 2, the path of the first color light 141 from first light source 140 can be traced through tilted dichroic polarized color combiner 100'. First color light 141 includes a first central light ray 142 travelling in the first light propagation direction, and a cone of rays within first input light collimation angle θ1, the boundaries of which are represented by first boundary light rays 144, 146. The first central light ray 142 is injected from first light source 140 into light input surface 114 in a direction generally parallel to the optical axis 102, passes through first lens element 110, second lens element 120, and emerges from light collection optics 105 as first central light ray 142 that is central to first collimated color light 141*c*. Each of the first boundary light rays 144, 146 are injected into the light input surface 114 in a direction generally at the first input light collimation angle θ1 to the optical axis 102, passes through first lens element 110, second lens element 120, and emerges from light collection optics 105 as first boundary light rays 144, 146 that form boundaries to first collimated color light 141*c*. As can be seen from FIG. 2, the light collection optics 105 serve to collimate the first color light 141 passing from the first light source 140, to emerge as first collimated color light 141*c*.

First central light ray 142 enters tilted dichroic polarizing beamsplitter 130, passes through third dichroic reflective polarizer 167 and intercepts first dichroic reflective polarizer 147 where it is split into a reflected first s-polarized central light ray 142*s* and a transmitted first p-polarized central light ray 142*p*.

Reflected first s-polarized central light ray 142*s* passes through third dichroic reflective polarizer 167 and exits tilted dichroic polarizing beamsplitter 130 through first face 131, intercepting first polarization rotating reflector 138*a* in a perpendicular direction, and reflecting as first converted p-polarized central light ray 142*p*2 perpendicular to polarization rotating reflector 138. First converted p-polarized central light ray 142p2 enters tilted dichroic polarizing beamsplitter 130 through first face 131, passes unchanged through first, second, and third dichroic reflective polarizers 147, 157, 167, and exits tilted dichroic polarizing beamsplitter 130 through output face 134 as first converted p-polarized central light ray 142p2.

Transmitted first p-polarized central light ray 142p passes through second dichroic reflective polarizer 157 and exits tilted dichroic polarizing beamsplitter 130 through third face 133, intercepting second polarization rotating reflector 138b in a perpendicular direction, and reflecting as first converted s-polarized central light ray 142s2 perpendicular to polarization rotating reflector 138. First converted s-polarized central light ray 142s2 enters tilted dichroic polarizing beamsplitter 130 through third face 133, passes unchanged through second dichroic reflective polarizer 157, reflects from first dichroic reflective polarizer 147, and exits tilted dichroic polarizing beamsplitter 130 through output face 134 as first converted s-polarized central light ray 142s2.

First boundary light rays 144, 146, enter tilted dichroic polarizing beamsplitter 130, pass through third dichroic reflective polarizer 167 and intercept first dichroic reflective polarizer 147 where they are split into reflected first s-polarized boundary light rays 144s, 146s, and transmitted first p-polarized boundary light rays 144p, 146p.

Reflected first s-polarized boundary light rays 144s, 146s, pass through third dichroic reflective polarizer 167 and exit tilted dichroic polarizing beamsplitter 130 through first face 131, intercepting first polarization rotating reflector 138a in a perpendicular direction, and reflecting as first converted p-polarized boundary light rays 144p2, 146p2, perpendicular to polarization rotating reflector 138. First converted p-polarized boundary light rays 144p2, 146p2, enter tilted dichroic polarizing beamsplitter 130 through first face 131, pass unchanged through first, second, and third dichroic reflective polarizers 147, 157, 167, and exit tilted dichroic polarizing beamsplitter 130 through output face 134 as first converted p-polarized boundary light rays 144p2, 146p2.

Transmitted first p-polarized boundary light rays 144p, 146p, pass through second dichroic reflective polarizer 157 and exit tilted dichroic polarizing beamsplitter 130 through third face 133, intercepting second polarization rotating reflector 138b in a perpendicular direction, and reflecting as first converted s-polarized boundary light rays 144s2, 146s2, perpendicular to polarization rotating reflector 138. First converted s-polarized boundary light rays 144s2, 146s2, enter tilted dichroic polarizing beamsplitter 130 through third face 133, pass unchanged through second dichroic reflective polarizer 157, reflect from first dichroic reflective polarizer 147, and exit tilted dichroic polarizing beamsplitter 130 through output face 134 as first converted s-polarized boundary light rays 144s2, 146s2.

In one particular embodiment, the first, second, and third collimated light 141c, 151c, 161c can be a green, a red, and a blue colored light that form a combined color p-polarized collimated light and a combined color s-polarized collimated light. Each of the first and second polarization rotating reflectors 138a, 138b, can impart different information to each of the polarization directions of each of the different colored lights. In some cases, the polarization rotating reflectors can be spatial light modulators such as LCoS imagers, and the combined color p-polarized collimated light can comprise p-polarized light having image information corresponding to a first LCoS imager 138a, and the combined color s-polarized collimated light can comprise s-polarized light having image information corresponding to a second LCoS imager 138b.

Figure 3:
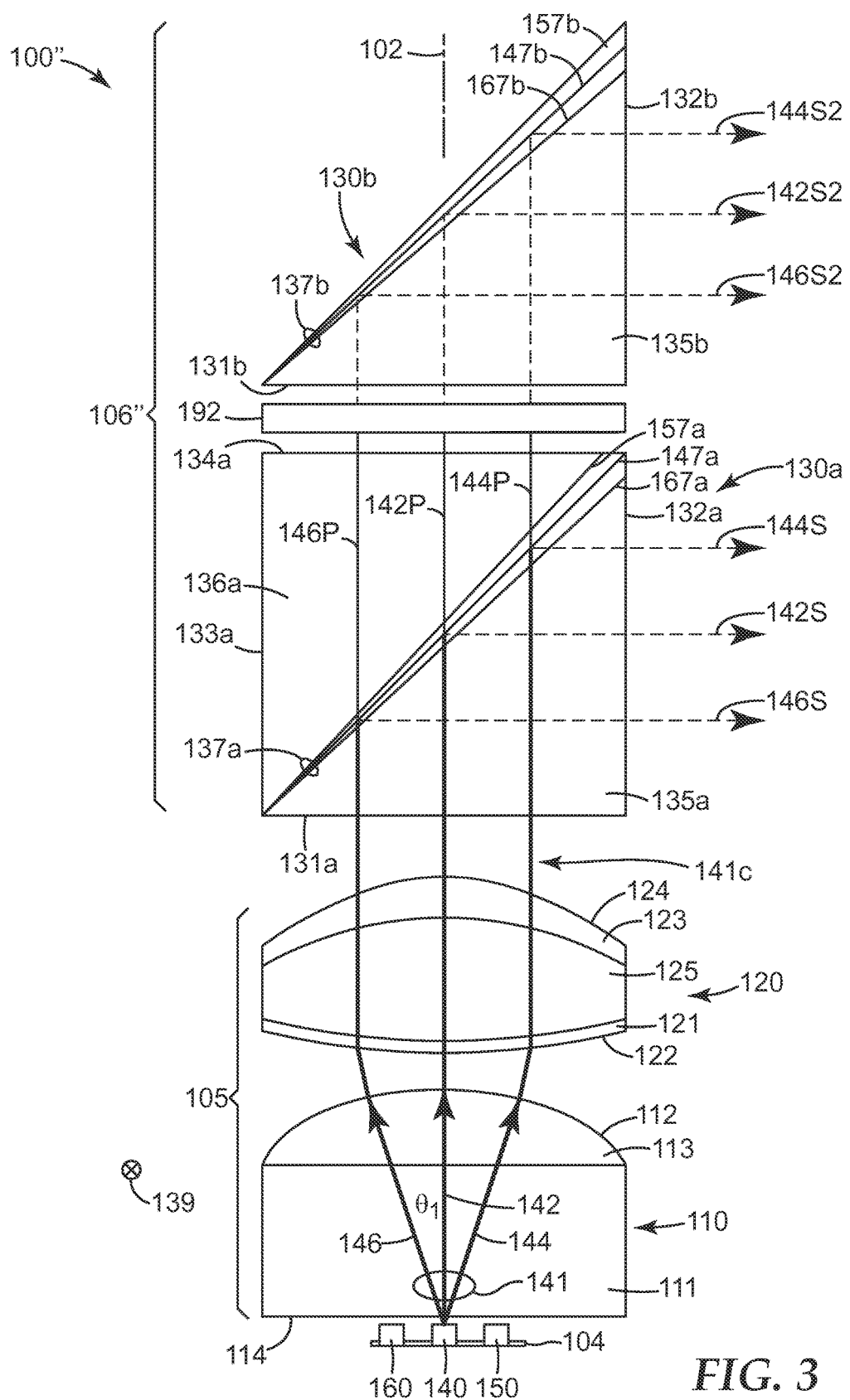
FIG. 3 shows a cross-section schematic of a tilted dichroic polarized color combiner.

FIG. 3 shows a cross-section schematic of a tilted dichroic polarized color combiner 100", according to one aspect of the disclosure. Tilted dichroic polarized color combiner 100" includes a light collection optics 105 and a tilted dichroic polarizing beamsplitter assembly 106". Light collection optics 105 includes a first lens element 110 and a second lens element 120, a light input surface 114, and an optical axis 102 perpendicular to the light input surface 114. A first light source 140, a second light source 150, and an optional third light source 160 are each disposed on a light injection surface 104 that faces the light input surface 114. At least two of the first, the second, and the optional third light sources 140, 150, 160, are displaced from the optical axis 102, and one of the first, the second, and the optional third light sources 140, 150, 160 can be positioned on the optical axis. Each of the first, the second, and the optional third light sources 140, 150, 160, are disposed to inject light into the light input surface 114 in a manner similar to that described with reference to FIGS. 1A-1C. For brevity, only the path of a first color light 141 will be described with reference to FIG. 3; however, it is to be understood that a second color light 151, and an optional third color light 161 will follow similar paths through tilted dichroic polarized color combiner 100", as described elsewhere.

In one particular embodiment, light collection optics 105 can be a light collimator that serves to collimate the light emitted from the first, second, and optional third light sources 140, 150, 160. Light collection optics 105 can include a one lens light collimator (not shown), a two lens light collimator (shown), a diffractive optical element (not shown), or a combination thereof. The two lens light collimator has first lens element 110 that includes a first convex surface 112 disposed opposite the light input surface 114. Second lens element 120 includes a second surface 122 facing the first convex surface 112, and a third convex surface 124 opposite the second surface 122. Second surface 122 can be selected from a convex surface, a planar surface, and a concave surface. The first color light 141 becomes a collimated first color light 141c upon exiting the light collection optics 105.

In one particular embodiment, tilted dichroic polarizing beamsplitter assembly 106" includes a first tilted dichroic polarizing beamsplitter 130a, a second tilted dichroic polarizing beamsplitter 130b, and a half-wave retarder disposed between them. In some cases, a prismatic polarizing beam splitter (as shown in the Figures) can be used for each of the first and second tilted dichroic polarizing beamsplitters 130a, 130b; however, alternatively, components can be retained as pellicles (not shown) in the optical path. The first tilted dichroic polarizing beamsplitter 130a includes a first prism 135a having an input face 131a, and a second face 132a, and a second prism 136a having a third face 133a and an output face 134a. The first tilted dichroic polarizing beamsplitter 130a further includes a first dichroic reflective polarizer plate 137a that includes a first dichroic reflective polarizer 147a, a second dichroic reflective polarizer 157a, and an optional third dichroic reflective polarizer 167a disposed on a diagonal of first tilted dichroic polarizing beamsplitter 130a, between the first and second prisms 135a, 136a.

The second tilted dichroic polarizing beamsplitter 130b includes a third prism 135b having an input face 131b, and a second output face 132b. The second tilted dichroic polarizing beamsplitter 130b further includes a second dichroic reflective polarizer plate 137b that includes a first dichroic reflective polarizer 147b, a second dichroic reflective polarizer 157b, and an optional third dichroic reflective polarizer 167b disposed on a diagonal of the third prism 135b. In some cases, each of the first, second, and third dichroic reflective polarizers 147b, 157b, 167b, in the second dichroic polarizer plate 137b can instead be first, second, and third dichroic reflectors, as known to one of skill in the art.

In one particular embodiment, each of the first dichroic reflective polarizer 147, second dichroic reflective polarizer 157, and optional third dichroic reflective polarizer 167 that are combined to form dichroic reflective polarizer plate 137, can be fabricated using thin-film inorganic deposition techniques as known to one of skill in the art. In some cases, each of the dichroic reflective polarizers can be fabricated on separate glass substrates that can be ground and polished to the desired angle, and bonded together using optical adhesives.

In one particular embodiment, different polymeric multilayer optical films can be used for each of the dichroic reflective polarizers. Multilayer optical film polarizers can include different "packets" of layers that serve to interact with different wavelength ranges of light. For example, a unitary multilayer optical film polarizer can include several packets of layers through the film thickness, each packet interacting with a different wavelength range (e.g. color) of light to reflect one polarization state and transmit the other polarization state. In one aspect, a multilayer optical film can have a first packet of layers adjacent a first surface of the film that interacts with, for example, blue colored light (that is, a "blue layers"), a second packet of layers that interacts with, for example, green colored light (that is, a "green layers"), and a third packet of layers adjacent a second surface of the film that interacts with, for example, red colored light (that is a "red layers"). Typically, the separation between layers in the "blue layers" is much smaller than the separation between layers in the "red layers", in order to interact with the shorter (and higher energy) blue wavelengths of light. In some cases, polymeric multilayer optical film polarizers can be particularly preferred reflective polarizers that can include packets of film layers as described above. Separate polymeric multilayer optical film polarizers can be fabricated in correspondence with the first, second, and optional third dichroic reflective polarizers 147, 157, 167, and assembled using glass substrates and optical adhesives to form the dichroic reflective polarizer plate 137.

The described components of the tilted dichroic polarizing beamsplitter 106" collectively convert each of the collimated (and unpolarized) first, second, and optional third color light 141c, 151c, 161c into a collimated combined s-polarized light, where each of the different collimated light colors are collimated in the same direction, as described with reference to the Figures.

Turning to FIG. 3, the path of the first color light 141 from first light source 140 can be traced through tilted dichroic polarized color combiner 100". First color light 141 includes a first central light ray 142 travelling in the first light propagation direction, and a cone of rays within first input light collimation angle θ1, the boundaries of which are represented by first boundary light rays 144, 146. The first central light ray 142 is injected from first light source 140 into light input surface 114 in a direction generally parallel to the optical axis 102, passes through first lens element 110, second lens element 120, and emerges from light collection optics 105 as first central light ray 142 that is central to first collimated color light 141c. Each of the first boundary light rays 144, 146 are injected into the light input surface 114 in a direction generally at the first input light collimation angle θ1 to the optical axis 102, passes through first lens element 110, second lens element 120, and emerges from light collection optics 105 as first boundary light rays 144, 146 that form boundaries to first collimated color light 141c. As can be seen from FIG. 3, the light collection optics 105 serve to collimate the first color light 141 passing from the first light source 140 to emerge as first collimated color light 141c.

First central light ray 142 enters first tilted dichroic polarizing beamsplitter 130a, passes through third dichroic reflective polarizer 167a and intercepts first dichroic reflective polarizer 147a where it is split into a reflected first s-polarized central light ray 142s and a transmitted first p-polarized central light ray 142p.

Reflected first s-polarized central light ray 142s passes through third dichroic reflective polarizer 167a and exits first tilted dichroic polarizing beamsplitter 130a through second face 132a.

Transmitted first p-polarized central light ray 142p passes through second dichroic reflective polarizer 157 and exits first tilted dichroic polarizing beamsplitter 130a through output face 134a, and rotates to become converted s-polarized central light ray 142s2 as it passes through half-wave retarder 192. Converted s-polarized central light ray 142s2 enters third prism 135b through input face 131b, passes through third dichroic reflective polarizer 167b, reflects from first dichroic reflective polarizer 147b, passes again through third dichroic reflective polarizer 167b and exits third prism 135b through second output face 132b.

First boundary light rays 144, 146, enter first tilted dichroic polarizing beamsplitter 130a, pass through third dichroic reflective polarizer 167a and intercept first dichroic reflective polarizer 147a where they are split into reflected first s-polarized boundary light rays 144s, 146s, and transmitted first p-polarized boundary light rays 144p, 146s.

Reflected first s-polarized boundary light rays 144s, 146s, pass through third dichroic reflective polarizer 167a and exit first tilted dichroic polarizing beamsplitter 130a through second face 132a.

Transmitted first p-polarized boundary light rays 144p, 146p, pass through second dichroic reflective polarizer 157 and exit first tilted dichroic polarizing beamsplitter 130a through output face 134a, and rotate to become converted s-polarized boundary light rays 144s2, 146s2, as they pass through half-wave retarder 192. Converted s-polarized boundary light rays 144s2, 146s2, enter third prism 135b through input face 131b, pass through third dichroic reflective polarizer 167b, reflect from first dichroic reflective polarizer 147b, pass again through third dichroic reflective polarizer 167b and exit third prism 135b through second output face 132b.

In one particular embodiment, the first, second, and third collimated light 141c, 151c, 161c can be a green, a red, and a blue colored light that form a combined color s-polarized collimated light. The combined color s-polarized collimated light can be used to illuminate a spatial light modulator such as an LCoS imager to generate an information-bearing image, and projection optics can be used to enlarge the image to a projection screen, as known to one of skill in the art.

According to one aspect, each input light source comprises one or more light emitting diodes (LED's). Various light sources can be used such as lasers, laser diodes, organic LED's (OLED's), and non solid state light sources such as ultra high pressure (UHP), halogen or xenon lamps with appropriate collectors or reflectors. Light sources, light collimators, lenses, and light integrators useful in the present invention are further described, for example, in Published U.S. Patent Application No. US 2008/0285129, the disclosure of which is herein included in its entirety.

Following are a list of embodiments of the present disclosure.

Item 1 is a color combiner, comprising: a light collection optic having a light input surface and an optical axis; a first and a second light source disposed to inject a first and a second color light into the light input surface, at least one of the first and second light sources displaced from the optical axis; a dichroic reflective polarizer plate comprising: a first dichroic reflective polarizer capable of reflecting a first polarization direction of the first color light toward a polarization rotating reflector, and transmitting other light; a second dichroic reflective polarizer capable of reflecting the first polarization direction of the second color light toward the polarization rotating reflector, and transmitting other light; wherein the first dichroic reflective polarizer and the second dichroic reflective polarizer are each tilted such that the first and the second color light reflect from the polarization rotating reflector to form a combined color polarized light beam having an orthogonal second polarization direction, the combined color polarized light beam propagating along a direction perpendicular to the polarization rotating reflector.

Item 2 is the color combiner of item 1, further comprising a polarizer disposed facing the light collection optic opposite the light input surface, capable of transmitting the first polarization direction of both the first and the second color light.

Item 3 is the color combiner of item 1 or item 2, wherein the dichroic reflective polarizer plate comprises a diagonal face of a polarizing beam splitter (PBS) or a pellicle.

Item 4 is the color combiner of item 1 to item 3, wherein the light collection optic comprises light collimation optics.

Item 5 is the color combiner of item 3, wherein the light collimation optics comprises a one lens design, a two lens design, a diffractive optical element, or a combination thereof.

Item 6 is the color combiner of item 1 to item 5, wherein the light collection optics comprises: a first lens having a first convex surface opposite the light input surface; and a second lens having a second surface facing the first convex surface, and a third convex surface opposite the second surface.

Item 7 is the color combiner of item 1 to item 6, wherein the polarization rotating reflector comprises a quarter-wave retarder and a broadband mirror.

Item 8 is the color combiner of item 1 to item 7, wherein the polarization rotating reflector comprises a spatial light modulator.

Item 9 is the color combiner of item 8, wherein the spatial light modulator comprises a reflective liquid crystal on silicon (LCoS) display panel.

Item 10 is the color combiner of item 1 to item 9, wherein the first and second dichroic reflective polarizers each comprise a polymeric multilayer optical film or a coated dielectric film.

Item 11 is the color combiner of item 1 to item 10, further comprising a third light source disposed to inject a third color light into the light input surface, wherein the dichroic reflective polarizer plate further comprises a third dichroic reflective polarizer capable of reflecting the first polarization direction of the third color light toward the polarization rotating reflector and transmitting other light, the third dichroic reflective polarizer tilted such that the third color light reflects from the polarization rotating reflector to form the combined color light beam having the second polarization direction, the combined color light beam propagating along the direction perpendicular to the polarization rotating reflector.

Item 12 is the color combiner of item 11, wherein the third dichroic reflective polarizer comprises a polymeric multilayer optical film or a coated dielectric film.

Item 13 is the color combiner of item 11, wherein the first, the second, and the third color light comprise a red, a green, and a blue color light.

Item 14 is the color combiner of item 1 to item 13, wherein the polarizer comprises a reflective polarizer or an absorbing polarizer.

Item 15 is the color combiner of item 1 to item 13, further comprising a quarter-wave retarder disposed between the polarizer and the light collection optic.

Item 16 is an image projector, comprising the color combiner of item 1 to item 15 and projection optics.

Item 17 is a color combiner, comprising: a light collection optic having a light input surface and an optical axis; a first and a second light source disposed to inject a first and a second color light into the light input surface, at least one of the first and second light sources displaced from the optical axis; a dichroic reflective polarizer plate comprising: a first dichroic reflective polarizer capable of reflecting a first polarization direction of the first color light toward a first polarization rotating reflector, and transmitting other light toward a second polarization rotating reflector; a second dichroic reflective polarizer capable of reflecting the first polarization direction of the second color light toward the first polarization rotating reflector, and transmitting other light toward the second polarization rotating reflector; wherein the first dichroic reflective polarizer and the second dichroic reflective polarizer are each tilted such that: the first and the second color light reflect from the first polarization rotating reflector forming a first combined color light beam having an orthogonal second polarization direction; and the first and the second color light reflect from the second polarization rotating reflector to form a second combined color light beam having the first polarization direction, and the first and second combined color light beams propagating along a direction perpendicular to the first polarization rotating reflector.

Item 18 is the color combiner of item 17, wherein the dichroic reflective polarizer plate comprises a diagonal face of a polarizing beam splitter (PBS) or a pellicle.

Item 19 is the color combiner of item 17 or item 18, wherein the light collection optic comprises light collimation optics.

Item 20 is the color combiner of item 19, wherein the light collimation optics comprises a one lens design, a two lens design, a diffractive optical element, or a combination thereof.

Item 21 is the color combiner of item 17 to item 20, wherein the light collection optics comprises: a first lens having a first convex surface opposite the light input surface; and a second lens having a second surface facing the first convex surface, and a third convex surface opposite the second surface.

Item 22 is the color combiner of item 17 to item 21, wherein at least one of the first and second polarization rotating reflectors comprise a spatial light modulator.

Item 23 is the color combiner of item 17 to item 22, wherein the spatial light modulators comprises an LCoS display panel.

Item 24 is the color combiner of item 17 to item 23, wherein the first and second dichroic reflective polarizers each comprise a polymeric multilayer optical film or a coated dielectric film.

Item 25 is the color combiner of item 17 to item 24, further comprising a third light source disposed to inject a third color light into the light input surface, wherein the dichroic reflective polarizer plate further comprises a third dichroic reflective polarizer capable of reflecting the first polarization direction of the third color light toward the first polarization rotating reflector and transmitting other light toward a second polarization rotating reflector, wherein the third dichroic reflective polarizer is tilted such that the third color light reflects from the first polarization rotating reflector to become part of the first combined color light beam having the orthogonal second polarization direction; and the third color light reflects from the second polarization rotating reflector to become part of the second combined color light beam having the first polarization direction.

Item 26 is the color combiner of item 25, wherein the third dichroic reflective polarizer comprises a polymeric multilayer optical film or a coated dielectric film.

Item 27 is the color combiner of item 25 or item 26, wherein the first, the second, and the third color light comprise a red, a green, and a blue color light.

Item 28 is an image projector, comprising the color combiner of item 17 to item 27 and projection optics.

Item 29 is a color combiner, comprising: a light collection optic having a light input surface and an optical axis; a first, a second, and a third light source disposed to inject a first, a second, and a third color light into the light input surface, at least one of the first, the second, and the third light sources displaced from the optical axis; a dichroic reflective polarizer plate comprising: a first dichroic reflective polarizer capable of reflecting a first polarization direction of the first color light toward an output direction, and transmitting other light; a second dichroic reflective polarizer capable of reflecting the first polarization direction of the second color light toward the output direction, and transmitting other light; a third dichroic reflective polarizer capable of reflecting the first polarization direction of the third color light toward the output direction, and transmitting other light; a half-wave retarder disposed to convert an orthogonal second polarization direction of the transmitted other light to the first polarization direction; a dichroic reflector plate disposed to reflect the first polarization direction of the transmitted other light to the output direction, the dichroic reflector plate comprising: a first dichroic reflector capable of reflecting the first polarization direction of the first color light toward the output direction; a second dichroic reflector capable of reflecting the first polarization direction of the second color light toward the output direction; and a third dichroic reflector capable of reflecting the first polarization direction of the third color light toward the output direction; wherein the first, the second, and the third dichroic reflective polarizers, and the first, the second, and the third dichroic reflectors are each tilted such that the first, the second, and the third color light form a combined color light beam having the first polarization direction.

Item 30 is the color combiner of item 29, wherein the dichroic reflective polarizer plate comprises a diagonal face of a polarizing beam splitter (PBS) or a pellicle.

Item 31 is the color combiner of item 29 or item 30, wherein the light collection optic comprises light collimation optics.

Item 32 is the color combiner of item 29 to item 31, wherein the first, the second, and the third dichroic reflective polarizers each comprise a polymeric multilayer optical film or a coated dielectric film.

Item 33 is the color combiner of item 29 to item 32, wherein the first, the second, and the third color light comprise a red, a green, and a blue color light.

Item 34 is an image projector, comprising the color combiner of item 29 to item 33, a spatial light modulator disposed to impart an image on the combined color light beam; and projection optics.

Item 35 is the image projector of item 34, wherein the spatial light modulator comprises a liquid crystal on silicon (LCoS) imager or a transmissive liquid crystal display (LCD).

Unless otherwise indicated, all numbers expressing feature sizes, amounts, and physical properties used in the specification and claims are to be understood as being modified by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A color combiner, comprising:
    a light collection optic having a light input surface and an optical axis;
    a first and a second light source disposed to inject a first and a second color light into the light input surface, at least one of the first and second light sources displaced from the optical axis;
    a dichroic reflective polarizer plate comprising:
        a first dichroic reflective polarizer tilted to reflect a first polarization direction of the first color light at a first angle toward a polarization rotating reflector, and transmit at least the first polarization direction of the second color light; and
        a second dichroic reflective polarizer, different from the first dichroic reflective polarizer, wherein the second dichroic reflective polarizer is tilted to reflect the first polarization direction of the second color light at a second angle, different from the first angle, toward the polarization rotating reflector, and transmit other light;
        wherein the first dichroic reflective polarizer and the second dichroic reflective polarizer are each tilted such that the first and the second color light reflect from the polarization rotating reflector to form a combined color polarized light beam having an orthogonal second polarization direction, the combined color polarized light beam propagating along a direction perpendicular to the polarization rotating reflector.

2. The color combiner of claim 1, further comprising a polarizer disposed facing the light collection optic opposite the light input surface, capable of transmitting the first polarization direction of both the first and the second color light.

3. The color combiner of claim 1, wherein the dichroic reflective polarizer plate comprises a diagonal face of a polarizing beam splitter (PBS) or a pellicle.

4. The color combiner of claim 1, wherein the light collection optics comprises:
   a first lens having a first convex surface opposite the light input surface; and
   a second lens having a second surface facing the first convex surface, and a third convex surface opposite the second surface.

5. The color combiner of claim 1, wherein the polarization rotating reflector comprises a quarter-wave retarder and a broadband mirror.

6. The color combiner of claim 1, wherein the polarization rotating reflector comprises a spatial light modulator.

7. The color combiner of claim 1, further comprising a third light source disposed to inject a third color light into the light input surface, wherein the dichroic reflective polarizer plate further comprises a third dichroic reflective polarizer, different from the first and the second dichroic reflective polarizers, wherein the third dichroic reflective polarizer reflects the first polarization direction of the third color light at a third angle, different from the first angle and the second angle, toward the polarization rotating reflector and transmits other light, the third dichroic reflective polarizer being tilted such that the third color light reflects from the polarization rotating reflector to form the combined color polarized light beam having the orthogonal second polarization direction, the combined color polarized light beam propagating along the direction perpendicular to the polarization rotating reflector.

8. The color combiner of claim 2, further comprising a quarter-wave retarder disposed between the polarizer and the light collection optic.

9. An image projector, comprising the color combiner of claim 1 and projection optics.

10. A color combiner, comprising:
    a light collection optic having a light input surface and an optical axis;
    a first and a second light source disposed to inject a first and a second color light into the light input surface, at least one of the first and second light sources displaced from the optical axis;
    a dichroic reflective polarizer plate comprising:
      a first dichroic reflective polarizer tilted to reflect a first polarization direction of the first color light at a first angle toward a first polarization rotating reflector, and transmit at least the first polarization direction of the second color light toward a second polarization rotating reflector;
      a second dichroic reflective polarizer, different from the first dichroic reflective polarizer, wherein the second dichroic reflective is tilted to reflect the first polarization direction of the second color light at a second angle, different from the first angle, toward the first polarization rotating reflector, and transmit other light toward the second polarization rotating reflector;
      wherein the first dichroic reflective polarizer and the second dichroic reflective polarizer are each tilted such that:
        the first and the second color light reflect from the first polarization rotating reflector forming a first combined color light beam having an orthogonal second polarization direction; and
        the first and the second color light reflect from the second polarization rotating reflector to form a second combined color light beam having the first polarization direction,
        the first and second combined color light beams propagating along a direction perpendicular to the first polarization rotating reflector.

11. The color combiner of claim 10, wherein the dichroic reflective polarizer plate comprises a diagonal face of a polarizing beam splitter (PBS) or a pellicle.

12. The color combiner of claim 10, wherein the light collection optics comprises:
    a first lens having a first convex surface opposite the light input surface; and
    a second lens having a second surface facing the first convex surface, and a third convex surface opposite the second surface.

13. The color combiner of claim 10, wherein at least one of the first and second polarization rotating reflectors comprise a spatial light modulator.

14. The color combiner of claim 13, wherein the spatial light modulator comprises an LCoS display panel.

15. The color combiner of claim 10, wherein the first and second dichroic reflective polarizers each comprise a polymeric multilayer optical film or a coated dielectric film.

16. The color combiner of claim 10, further comprising a third light source disposed to inject a third color light into the light input surface, wherein the dichroic reflective polarizer plate further comprises a third dichroic reflective polarizer tilted to reflect the first polarization direction of the third color light at a third angle, different from the first angle and the second angle, toward the first polarization rotating reflector and transmitting other light toward the second polarization rotating reflector, wherein the third dichroic reflective polarizer is tilted such that the third color light reflects from the first polarization rotating reflector to become part of the first combined color light beam having the orthogonal second polarization direction; and the third color light reflects from the second polarization rotating reflector to become part of the second combined color light beam having the first polarization direction.

17. An image projector, comprising the color combiner of claim 10 and projection optics.

18. A color combiner, comprising:
    a light collection optic having a light input surface and an optical axis;
    a first, a second, and a third light source disposed to inject a first, a second, and a third color light into the light input surface, at least one of the first, the second, and the third light sources displaced from the optical axis;
    a dichroic reflective polarizer plate comprising:
      a first dichroic reflective polarizer that reflects a first polarization direction of the first color light at a first angle toward an output direction, and transmitting at least the first polarization direction of the second and third color light;
      a second dichroic reflective polarizer, different from the first dichroic reflective polarizer, wherein the second dichroic polarizer reflects the first polarization direction of the second color light at a second angle, different from the first angle, toward the output direction, and transmitting at least the first polarization direction of the third color light;

a third dichroic reflective polarizer, different from the first dichroic reflective polarizer and the second dichroic reflective polarizer, wherein the third dichroic polarizer reflects the first polarization direction of the third color light at a third angle, different from the first and the second angles, toward the output direction, and transmitting other light;

a half-wave retarder disposed to convert an orthogonal second polarization direction of the transmitted other light to the first polarization direction;

a dichroic reflector plate disposed to reflect the first polarization direction of the transmitted other light to the output direction, the dichroic reflector plate comprising:

a first dichroic reflector capable of reflecting the first polarization direction of the first color light toward the output direction;

a second dichroic reflector capable of reflecting the first polarization direction of the second color light toward the output direction; and a third dichroic reflector capable of reflecting the first polarization direction of the third color light toward the output direction;

wherein the first, the second, and the third dichroic reflective polarizers, and the first, the second, and the third dichroic reflectors are each tilted such that the first, the second, and the third color light form a combined color light beam having the first polarization direction.

19. The color combiner of claim 18, wherein the dichroic reflective polarizer plate comprises a diagonal face of a polarizing beam splitter (PBS) or a pellicle.

20. An image projector, comprising the color combiner of claim 18, a spatial light modulator disposed to impart an image on the combined color light beam; and projection optics.

* * * * *